Patented Aug. 18, 1953

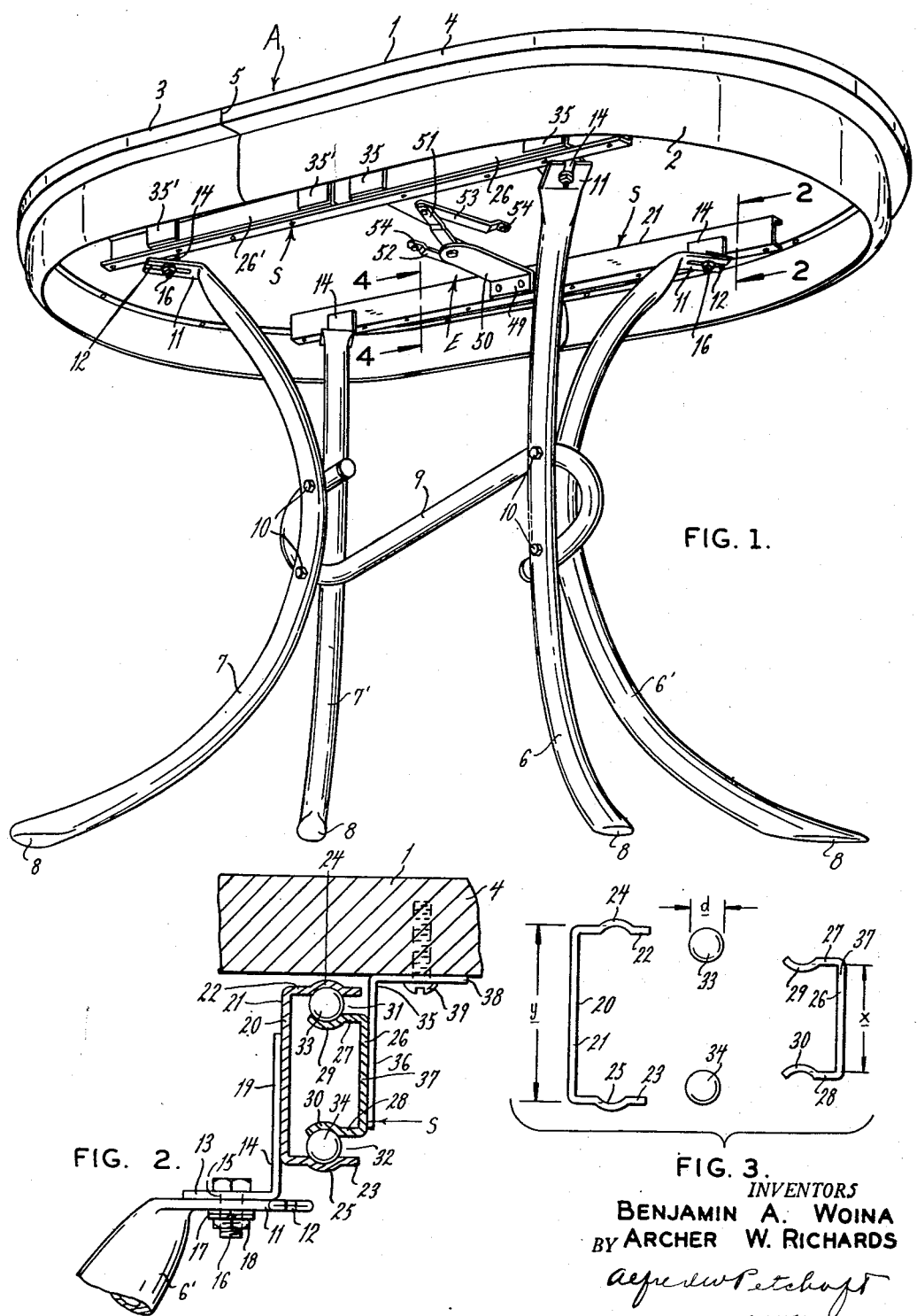

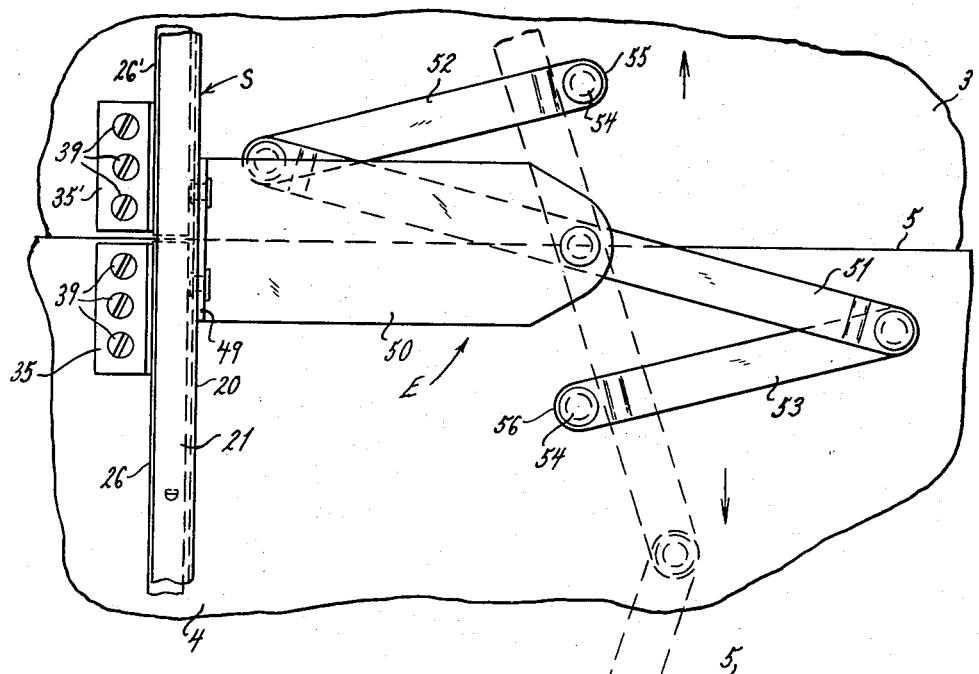
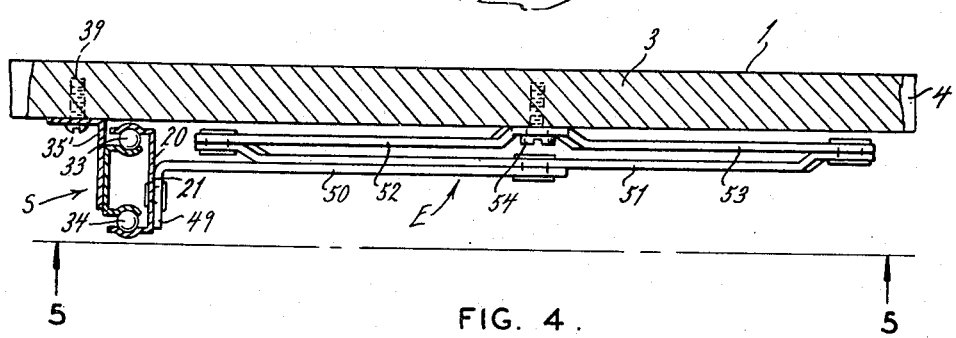

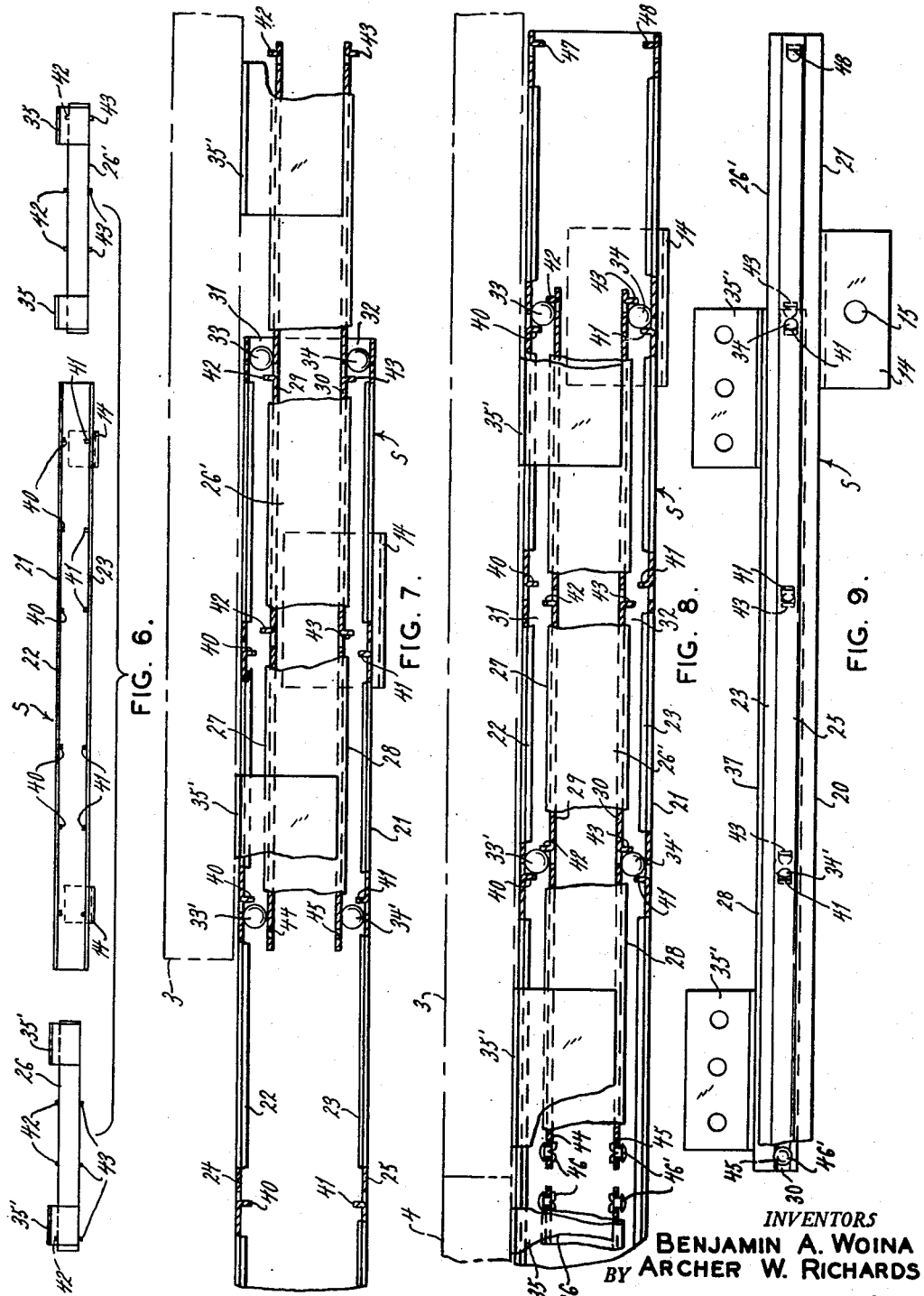

2,649,346

UNITED STATES PATENT OFFICE 2,649,346

BALL BEARING SLIDE STRUCTURE FOR TABLE FURNITURE

Benjamin A. Woina, Salem, and Archer W. Richards, Chagrin Falls, Ohio, assignors to American Fixture and Manufacturing Co., St. Louis, Mo., a corporation of Missouri Application March 10, 1950, Serial No. 148,871

2 Claims. (Cl. 311—71)

This invention relates in general to extension tables and, more particularly, to certain new and useful improvements in ball bearing slide structure for table furniture.

The primary object of the present invention is to provide a table having symmetrical sections with a plurality of three-part slides associated therewith for moving said sections into extended position to permit the insertion of a table leaf.

A further object of the present invention is to provide a slide for a table incorporating an outer rail and a pair of similar inner rails for movement with relation to the outer rail, said rails being pre-stressed for exerting pressure upon bearing members in order to prevent unauthorized, free movement of the bearings.

It is an additional object of the present invention to provide a table-slide which integrally embodies detent means for limiting the extensible movements of said sections.

It is another object of the present invention to provide a ball bearing table-slide capable of being economically formed of sheet metal or similar material and being adopted for use in the construction of a pedestal type extension table, such as a Duncan Phyfe table, for example.

With the above and other objects in view, our invention resides in the novel features of form, construction, arrangement, and combination of parts presently described and pointed out in the claims.

In the accompanying drawings (three sheets),

Figure 1 is a perspective view of an extension table constructed in accordance with, and embodying, the present invention;

Figure 2 is a fragmentary transverse sectional view taken along line 2—2 of Figure 1;

Figure 3 is an exploded view of the slide;

Figure 4 is a transverse sectional view taken along line 4—4 of Figure 1;

Figure 5 is a transverse sectional view taken along line 5—5 of Figure 4;

Figure 6 is an exploded view of the slide prior to assembly thereof;

Figure 7 is a fragmentary longitudinal sectional view showing the slide in partially assembled position;

Figure 8 is a fragmentary longitudinal sectional view showing the slide in fully assembled position; and Figure 9 is a top plan view of the assembled slide.

Referring now in more detail and by reference characters to the drawings, which illustrate a preferred embodiment of the present invention, A designates a table designed in the style of Duncan Phyfe having a table top 1 of general elliptical design with an inset, depending, relatively full skirt 2, and comprised of symmetrical sections 3, 4, which normally abut on their inner margins, as at 5. The table A is provided with two pair of gracefully curved legs 6, 6', and 7, 7', which are each flattened at their lower ends, as at 8, to present a sturdy, wide spread support. The legs 6, 6', 7, 7', are disposed so that the arcs of their curves will extend inwardly in the direction of, and at an angle to, the longitudinal axis of the table A and then outwardly therefrom, whereby the central portions of the legs 6, 6', 7, 7', of each pair will be brought into close proximity to the adjacent leg (as may be seen in Figure 1). Extending longitudinally between the pairs of legs 6, 6', and 7, 7', is a central connector or brace member 9 preferably, though not necessarily, having its end portions oppositely curved in the general provision of an S, each curve of which extends between one pair of the legs 6, 6', and 7, 7', at their closest point of proximity and is secured thereto by bolts 10, extending through vertically aligned apertures in the brace 9 adjacent the bight of the curved ends and suitable, horizontally aligned apertures in the legs 6, 6', 7, 7'.

The legs 6, 6', 7, 7', being preferably constructed of tubular chrome, are each compressed at their upper ends to provide a flattened head portion 11 which is bent into substantial parallelism with the plane of the table top 1 and is provided with an elongated recess 12 extending inwardly from its end margin. Abutting surfacewise on the upper face of the said head portion 11 of each leg 6, 6', 7, 7', is the bottom flange 13 of an angle plate 14, said bottom flange 13 having an aperture 15, aligned with the recess 12 for receiving a bolt 16 upon the lower projecting end of which is engaged a washer 17 and nut 18 for maintaining said legs 6, 6', 7, 7', securely to the plates 14 which are suitably secured adjacent one end of each of a pair of slides S, respectively, as by welding the upwardly directed leg 19 of the plate 14 to the web portion 20 of an outwardly opening outer rail 21, fabricated of suitable metal sheet stock, and being adapted to tie the upper ends of the legs 6, 7, and 6', 7', together in the formation of a unitary pedestal. The outer rails 21 extend substantially from end to end of said table top 1 and are not in any way immediately connected thereto. Said rails 21, being of channel-shaped form, have upper and lower horizontal flanges 22, 23, which have integrally formed therein longitudinally extending and inwardly opening grooves 24, 25, respectively. Provided for disposition within each of the rails 21 is a pair of inwardly opening, channel-shaped inner rails 26, 26', the rail 26 being disposed within the portion of the rail 21 adjacent the under face of the section 4, with the rail 26' being disposed within the portion of the outer rail 21 adjacent the under face of the section 3 of the table top 1. Each of the rails 26, 26', is provided with upper and lower horizontal flanges 27, 28, having integrally formed therein outwardly opening grooves 29, 30, respectively, in registration with the grooves 24, 25, of the rail 21 to form raceways 31, 32, respectively, within which are disposed a pair of ball bearings 33, 33', and 34, 34', respectively. It will thus be seen that each slide S contains eight ball bearings. Each of the rails 26 are secured to the under face of the section 4 of the table top 1 by means of a pair of spaced angle brackets 35, their depending flanges 36 secured, as by welding, to the webs 37 of the rails 26, and having horizontal flanges 38 which are secured to the section 4 by screws 39. Similarly, the inner rails 26' are secured to the under face of the section 3 of the table top 1 by brackets 35'.

The total length of the distance between the base portion of the grooves 29, 30, and the diameters of the ball bearings 33, 34, designated $x$ and $d$ in Figures 3, is slightly greater than the distance between the bases of the grooves 24, 25, designated $y$ in Figure 3, so that said ball bearings 33, 33', 34, 34', will cause a flexure of the rails 21, 26, 26', which effects a pressure or so-called "pre-stress" upon said ball bearings 33, 33', 34, 34', to prevent unauthorized free rolling thereof within the raceways 31, 32.

The flanges 22, 23, of the rails 21 are integrally provided with a series of spaced vertically aligned downstruck and upstruck tabs 40, 41, respectively. Similarly, the flanges 27, 28, of each of the inner rails 26, 26', are integrally provided with a series of three vertically aligned, spaced upstruck and downstruck tabs 42, 43, respectively. It is to be particularly noted that a set of tabs 42, 43, is provided adjacent the outer ends of said rails 26, 26', while the inner ends thereof are not so provided (see Figures 7 and 8).

In assembling the slides S, the inner rail 26' is inserted partially into one end of the rail 21 (see Figure 7) and thereon through said end of the rail 21 ball bearings 33, 34, are inserted in their respective raceways 31, 32, respectively, into substantial proximity to the adjacent tabs 42, 43, of the flanges 27, 28, respectively. At the inner end of the inner rail 26' ball bearings 33', 34', are inserted through the mouth of the rail 21 into the respective raceways 31, 32. Then the inner rail 26' is moved inwardly within the rail 21 until the tabs 42, 43, on the outer end thereof are in abutment against the ball bearings 33, 34 (see Figure 8), which have been moved thereby into abutment against tabs 40, 41, respectively, of the outer rail 21.

Next, there is inserted adjacent the inner end of the rail 26' within apertures 44, 45, provided in the flanges 27, 28, respectively, rivet members 46, 46', the heads of which project into the raceways 31, 32, and the other ends of which are split and spread outwardly upon the inner faces of the flanges 27, 28, for maintaining the rivets 46, 46', securely in position. Finally, at the outer end of the rail 21, detent tabs or end stops 47, 48, precut in the flanges 22, 23, are downstruck and upstruck, respectively, to prevent the ball bearings 33, 34, from unauthorized rolling out of the slides S.

In a similar manner the inner rails 26 and the ball bearings 33, 33', 34, 34', associated therewith are inserted within the opposite end of the outer rail 21. It will thus be seen that the rivets 46, 46', provided on the inner ends of the rails 26, 26', serve as detents for preventing the ball bearings 33', 34', from unauthorizedly rolling out of the slide S or the inner rails 26, 26', from being pulled entirely out of operative position within the outer rail 21.

Thus, when the inner rails 26, 26', are in fully inserted disposition within the outer rail 21, as shown in Figure 8, the slides S are in maximum telescoped or contracted position, whereupon, the table top sections 3, 4, will be in abutting relationship along their inner margins, as shown in Figure 1. When the user desires to extend the sections 3, 4, of the table top 1 to permit the insertion of a table leaf (not shown) in a conventional manner, the inner rails 26, 26', will move with relation to, and outwardly through the ends of, the outer rail 21 which is maintained in substantially stationary or rigid position by the legs 6, 6', 7' 7'. Outward extended movement of the sections 3, 4, will be limited by the ball bearings 33, 34, associated with each of said sections 3, 4, being rolled into detaining contact against the end stops 47, 48, provided at each end of the outer rail 21, by the inwardly adjacent pair of tabs 42, 43, of the inner rails 26, 26'. It will be noted that in the course of such outward movement the ball bearings 33', 34', will be moved by engagement with the heads of the rivets 46, 46'.

It is to be particularly pointed out, with reference to Figures 7 and 8, that the ball bearings 33, 33', 34, 34', will contact the various tab members, as described above, provided upon the inner and outer rails 26, 26', 21, respectively, across the apertures of the respective tabs developed in the flanges 22, 23, 27, 28, by the upward or downward folding of the tabs, as the case may be. Thus, the force effected upon the tabs by impact with the ball bearings 33, 33', 34, 24', will not bend the tabs down into original or flattened position during usage.

The distance between the adjacent pairs of tabs 42, 43, on the inner rails 26, 26', controls the length of extensibility since the distance therebetween defines the distance of roll of the ball bearings. Since it is recognized that a ball bearing will travel one-half the total distance of traverse of the slide, the extension of the inner rails 26, 26', to their outermost extension will provide a space between the inner margins of the table top sections 3, 4, equivalent to substantially four times the distance between adjacent pairs of tabs 42, 43.

Suitably secured, as by rivets, centrally upon the outer face of the web 20 of one of the outer rails 21 is the downwardly directed end flange 49 of a support plate 50 of an equalizer unit E. Said plate 50 being in downwardly spaced relation to the under face of the table top 1, extends inwardly toward the longitudinal center line thereof, having its transverse axis normally in alignment with the line of meeting between the inner margin of the table top sections 3, 4. Adjacent to, and upon, the inner extremity of the plate 50, in alignment with its transverse axis, there is pivotally mounted, at its center point, a lever arm 51. At each of its ends, the lever arm 51 is bent upwardly and pivotally connected to one end of links 52, 53, of equal length, which are, in turn, at their other ends bent upwardly and rigidly secured, as by screws 54, to the table top sections 3, 4, as at 55, 56, respectively, which points of securement are in alignment with the longitudinal axis of the table top 1. When the sections 3, 4, are moved into extended position by action of the slides S, as above described, the links 52, 53, will exert a longitudinally directed pulling upon the lever arm 51 which is thereby pivoted about its center point into substantially longitudinal extending position (see Figure 5). Since the links 52, 53, are of the same length, the distance each section 3, 4, will be moved during extension will be equal.

It should be understood that changes and modifications in the form, construction, arrangement, and combination of the several parts of the extension table may be made and substituted for those herein shown and described without departing from the nature and principle of our invention.

Having thus described our invention what we claim and desire to secure by Letters Patent is:

1. A ball bearing slide for table furniture and the like, said slide comprising a flat vertical web integrally provided along its upper and lower margins with oppositely curved arcuate flanges terminating in spaced parallel margins in the formation of a section having a somewhat C-shaped cross-sectional contour, two relatively short slides telescopically mounted in endwise aligned relation within each channel, said slides each comprising a flat web approximately as wide as the space between margins of the channel for fitting closurewise thereacross, the webs of said slides each being integrally provided along its upper and lower margins with inwardly extending arcuate flanges, the upper such flange being curved oppositely to and complementary with the upper flange of the channel to form an upper raceway and, similarly, the lower flange of the slides each being curved oppositely to and complementary with the lower flange of the channel to form a lower raceway, and ball bearings operatively mounted in said raceways, said ball bearings being slightly larger in diametral size than the normal height of said raceways for placing the webs of the channel and slides under stress when the ball bearings are operatively installed in said raceways.

2. A ball bearing slide for table furniture and the like, said slide comprising a flat vertical web integrally provided along its upper and lower margins with oppositely curved arcuate flanges terminating in spaced parallel margins in the formation of a section having a somewhat C-shaped cross-sectional contour, two relatively short slides telescopically mounted in endwise aligned relation within each channel, said slides each comprising a flat web approximately as wide as the space between margins of the channel for fitting closurewise thereacross, the webs of said slides each being integrally provided along its upper and lower margins with inwardly extending arcuate flanges, the upper such flange being curved oppositely to and complementary with the upper flange of the channel to form an upper raceway and, similarly, the lower flange of the slides each being curved oppositely to and complementary with the lower flange of the channel to form a lower raceway, each slide being provided in its upper flange with a set of four longitudinally spaced upstanding stops and in its lower flange with a set of four longitudinally spaced depending stops, each channel being in turn provided in its upper flange with two sets of four longitudinally spaced depending stops and in its lower channel with two sets of four longitudinally spaced upstanding stops, each two adjacent stops of the channel flanges being paired with two adjacent stops in the corresponding flange of one of the slides so as to define a raceway-section therebetween, and a single independent ball bearing operatively mounted in each raceway-section so that each slide is supported between four ball bearings each of which is movable within its own raceway-section independently of the others.

BENJAMIN A. WOINA.
ARCHER W. RICHARDS.

References Cited in the file of this patent

UNITED STATES PATENTS

| Number | Name | Date |
|---|---|---|
| 724,323 | Parish | Mar. 31, 1903 |
| 949,119 | Gruender | Feb. 15, 1910 |
| 1,121,611 | Casper | Dec. 22, 1914 |
| 1,122,205 | Ingells | Dec. 22, 1914 |
| 1,180,201 | Steingruber | Apr. 18, 1916 |
| 1,191,159 | Cunningham | July 18, 1916 |
| 2,007,475 | Miller | July 9, 1935 |
| 2,201,414 | Vance | May 21, 1940 |
| 2,323,604 | Hyland | July 6, 1943 |
| 2,467,080 | Duer | Apr. 12, 1949 |